United States Patent
Doi et al.

(10) Patent No.: US 6,602,328 B2
(45) Date of Patent: Aug. 5, 2003

(54) GAS TURBINE SUCTION AIR FILTER, A GAS TURBINE USING THE SAME AND A METHOD FOR USING THE SAME

(75) Inventors: Yoshiyuki Doi, Takasago (JP); Toyosei Aota, Takasago (JP); Katsutoshi Okuno, Takasago (JP); Shigeru Maehata, Kobe (JP); Kenji Isohasi, Sanda (JP); Tatsuo Adachi, Tokorozawa (JP); Satosi Hara, Sayama (JP)

(73) Assignees: Mitsubishi Heavy Industries, Ltd., Tokyo (JP); Kawasaki Prime Mover Engineering Co., Ltd., Kobe (JP)

( * ) Notice: Subject to any disclaimer, the term of this patent is extended or adjusted under 35 U.S.C. 154(b) by 0 days.

(21) Appl. No.: 09/838,189

(22) Filed: Apr. 20, 2001

(65) Prior Publication Data

US 2002/0083836 A1 Jul. 4, 2002

(30) Foreign Application Priority Data

Dec. 28, 2000 (JP) ......................................... 2000-401661

(51) Int. Cl.$^7$ ............................ B01D 41/00; B01D 46/00
(52) U.S. Cl. .............................. 95/278; 95/281; 95/282; 96/231; 96/233; 55/292; 55/304; 55/495; 55/497; 55/500; 55/521; 55/528
(58) Field of Search .......................... 95/278, 281, 282, 95/228, 231, 233; 55/282, 291, 292, 304, 495, 497, 498, 499, 500, 501, 521, 522, 523, 529, DIG. 31, 528

(56) References Cited

U.S. PATENT DOCUMENTS

| 4,222,755 A | * | 9/1980 | Grotto ........................... 55/291 |
|---|---|---|---|
| 4,482,365 A | * | 11/1984 | Roach ........................... 55/283 |
| 4,507,203 A | * | 3/1985 | Johnston ....................... 55/501 |
| 4,753,257 A | * | 6/1988 | Gabriel et al. .......... 134/166 R |
| 5,191,767 A | * | 3/1993 | Kane et al. ................. 55/467.1 |
| 5,290,446 A | * | 3/1994 | Degen et al. ................. 55/486 |
| 5,709,735 A | * | 1/1998 | Midkiff et al. ................ 55/521 |
| 5,743,927 A | * | 4/1998 | Osendorf ...................... 55/497 |
| 5,895,510 A | * | 4/1999 | Butler et al. .................. 55/497 |
| 5,902,361 A | * | 5/1999 | Pomplun et al. ........... 55/385.3 |
| 6,214,093 B1 | * | 4/2001 | Nabata et al. ................ 55/486 |

FOREIGN PATENT DOCUMENTS

| JP | 9-276633 | * | 10/1997 | ........... B01D/41/04 |
|---|---|---|---|---|
| JP | 11-188322 | * | 7/1999 | ........... B01D/41/04 |
| JP | 2000-317230 A | * | 11/2000 | ........... B01D/41/04 |
| JP | 2001-232309 A | * | 8/2001 | ........... B01D/41/04 |
| JP | 2002-28593 A | * | 1/2002 | ........... B01D/41/04 |

* cited by examiner

*Primary Examiner*—Duane Smith
*Assistant Examiner*—Jason M. Greene
(74) *Attorney, Agent, or Firm*—Wenderoth, Lind & Ponack, L.L.P.

(57) ABSTRACT

A gas turbine suction air filter is provided wherein, despite a large capacity, dust is easily removed by an ultrasonic washer. A gas turbine suction air filter (1) has a box-like frame member (3) and a filter cloth (5) contained in the frame member (3). The frame member (3) is made of a metal material, preferably a stainless steel. The filter cloth (5) is formed having many pleats so that many folded faces (7) are formed. No intervening member is provided between adjacent folded faces (7, 7), with only a space being arranged there. The filter cloth (5) is a non-woven fabric of a synthetic resin fiber, preferably a polypropylene fiber. While this filter (1) has a large capacity, an ultrasonic wave reaches the entire filter cloth (5) when the filter (1) is washed by an ultrasonic washer.

8 Claims, 5 Drawing Sheets

GAS TURBINE SUCTION AIR FILTER, A GAS TURBINE USING THE SAME AND A METHOD FOR USING THE SAME

BACKGROUND OF THE INVENTION

1. Field of the Invention

The present invention relates to a gas turbine suction air filter, a gas turbine using this filter and a method for using this filter.

2. Description of the Prior Art

A gas turbine generally comprises an air suction portion, a compressor, a combustor and a turbine portion. Air is taken from the air suction portion and is supplied into the compressor to be compressed. The compressed air is sent to the combustor. In the combustor, the compressed air and fuel are mixed together to be burned continuously. By the combustion, a high temperature, high pressure combustion gas is generated to be supplied into the turbine portion. By expansion of the combustion gas, moving blades of the turbine portion are driven to rotate a rotor and thereby to generate an electric power.

If foreign matters, such as dust, is included in the air to be supplied into the compressor, the foreign matters attaches to the blades of the compressor to thereby reduce the compression efficiency. Thus, in order to remove the foreign matters, the air is filtered at the air suction portion. Usually, the air suction portion is provided with a first filter portion, which is constructed by a multiplicity of juxtaposed coarse dust filters, a second filter potion, which is constructed by a multiplicity of juxtaposed medium and high performance filters, and a third filter portion which is constructed by a multiplicity of juxtaposed ultra-high performance filters. With these filter portions, dust is removed. It is to be noted that, in some gas turbines, the third filter portion is ommitted.

As clogging occurs in each of the filters after long term use, the filter must be replaced. It is the present situation that the coarse dust filter is replaced at an interval of about three months, the medium and high performance filter at an interval of about 6 to 12 months and the ultra-high performance filter at an interval of about 12 months. The filter, after use, is disposed as industrial waste.

As the gas turbine consumes a large volume of air, a multiplicity of filters are needed. For example, in a usual gas turbine, the first filter portion, the second filter portion and the third filter portion, have some hundreds of filters therein, and each of the filters has an opening area of about 0.35 m². Therefore, in every case of the replacement, a large quantity of industrial waste is discharged. This causes a problem from the viewpoint of the environment preservation. Also, it is not preferable, from the point of view of resource savings, to use such a large quantity of filters This invites an increase in the running cost of the gas turbine.

In view of the above mentioned problems, trials are been done recently to wash the filter after used for reuse thereof. For the washing, an ultrasonic washer is most appropriate. In the ultrasonic washer, cavitations are generated by an ultrasonic wave. When these cavitations disappear, impulse forces are generated and the dust attached to the filter cloth is thereby removed.

FIG. 5 is a partial cross sectional view of one prior art example of a medium and high performance filter 51 which is used in the air suction portion. In FIG. 5, air comes from the direction of arrow A and passes through the filter 51. The filter 51 comprises a multiplicity of separators 53 which are made of aluminum or the like. Each of the separators 53 is formed in a corrugated shape and extends perpendicularly to the plane of FIG. 5. A filter cloth 55, which is made of a glass fiber non-woven fabric or the like, is provided between each of the separators 53. The filter cloth 55 is arranged in a serpentine form so as to alternately pass right hand ends and left hand ends of the separator 53. By this arrangement, area of the filter cloth 55, which is also an air passing area, becomes larger and the dust collection efficiency is enhanced.

As the gas turbine consumes a large volume of air, as described above, the multiplicity of filters 51 are used in the air suction portion. For this reason, the air suction portion becomes extremely large. Thus, the gas turbine needs a wide installation space and construction costs becomes high. In order to mitigate this problem, in the filter 51 for the gas turbine, as compared with general filters, such as those for air conditioning in a building, a pitch P, as shown in FIG. 5, between each of the separators 53 is made smaller. Hence, the air passing area becomes large, the number of filters 51 to be used for the air suction portion is reduced, and a smaller size of the air suction portion is thereby attained.

For example, while the separator pitch in the general filter is 10 to 15 mm, the separator pitch P in the filter 51 for the gas turbine air suction portion is about 5 mm. By this arrangement, while the capacity, or the air passing volume per filter, of the general filter is 35 to 50 m³/minute, that of the gas turbine air suction portion attained is as high as about 50 to 70 m³/minute.

However, even though the filter 51 in which the separator pitch P is made smaller is washed by an ultrasonic washer, transmission of the ultrasonic wave is obstructed by the separator 53, so that the ultrasonic wave hardly reaches the entire portion of the filter cloth 55, and there is a problem in that the dust is not sufficiently removed. This problem makes the reuse of the filter 51 for the gas turbine air suction portion difficult as compared with a general filter.

Also, as mentioned above, the prior art filter 51 for use in the gas turbine suction air portion, after use, is disposed as industrial waste, not to be reused. This increases the running cost of the gas turbine having the air suction portion mounted with the filter 51.

SUMMARY OF THE INVENTION

In view of the mentioned problems in the prior art, it is an object of the present invention to provide a gas turbine suction air filter and a method for using the same by which a large capacity is realized and dust can be still be easily removed by an ultrasonic washer. Also, it is another object of the present invention to provide a gas turbine in which the filter of the present invention is used.

In order to achieve the mentioned objects, the present invention provides a gas turbine suction air filter comprising a frame member having an air passing cross section formed in a rectangular shape and a filter cloth contained in the frame member. The filter cloth is folded so that a multiplicity of folded faces may be formed along an air passing direction and adjacent ones of the folded faces directly confront each other with only a space being arranged therebetween.

In the mentioned filter, as the filter cloth is folded so that the multiplicity of the folded faces may be formed along the air passing direction, the air passing area is large and hence the capacity is large. Also, in this filter, as the adjacent ones of the folded faces directly confront each other with only a space being arranged between them, and no intervening member, such as a separator, is provided between adjacent ones of the folded faces, the ultrasonic wave reaches to the entire filter cloth. Thus, sufficient dust removal can be attained by the ultrasonic washer.

It is preferable that the frame member constituting the mentioned filter of the present invention is made of a metal material.

In the metal material, the ultrasonic wave transmission is damped less. Also, as the metal material is excellent in the strength and rigidity, the thickness of the frame member can be made smaller as compared with a frame member constructed of a wooden material, a synthetic resin or the like. That is, in the frame member of the filter of the present invention, less damping of the ultrasonic wave is effected not only for the reason of the material, but also because of the thickness of the member. Thus, in this filter, even though the air passing area is large, the ultrasonic wave easily reaches to the entire filter cloth. This metal frame member is appropriate for use in the filter of a large capacity, or more concretely of a capacity (air volume passing through an opening area of 0.35 m$^2$) of 50 m$^3$/minute or more.

The frame member is preferably constructed of a stainless steel which effects less damping of the ultrasonic wave, is excellent in the strength and rigidity, and is also excellent in corrosion resistance.

The filter cloth is preferably made of a non-woven fabric including a synthetic resin fiber. As compared with glass fiber, synthetic resin fiber is more flexible and the fibers are entangled more densely. Thus, there is no need to use a binder for adhesion of the fibers as used in the glass fiber non-woven fabric. Also, there is no case where the binder dissolves into the wash liquid to loosen the fibers, as in the case of the glass fiber non-woven fabric. The filter cloth may be constructed of a combination of synthetic resin fiber and the glass fiber, but even in such case it is preferable that the ratio of the synthetic resin fiber to the entireity of the fibers is 50% or more in volume.

The synthetic resin fiber is preferably a polypropylene or polyester fiber, as it is produced on a large scale so as to be less expensive and generates no poisonous gas when it is burned for disposal.

Further, in place of the synthetic resin fiber, a porous sheet made of a synthetic resin may be used. The porous sheet made of the synthetic resin has numerous minute pores for passing air and uses no fiber. Hence, occurs no loosening of the fiber occurs. In the porous sheet of synthetic resin, there is a need to form numerous minute air holes for securing a filter performance and, in view of strength and the manufacturing process, it is preferable to use a polytetrafluoroethylene resin as a base material.

Also, in order to achieve the above mentioned objects, the present invention provides a gas turbine suction air filter comprising a frame member formed in a cylindrical shape and having an air passing portion at a cylinder portion of the cylindrical shape. A filter cloth is formed in a cylindrical shape and is contained in the frame member. The filter cloth is a non-woven fabric including a synthetic resin fiber.

In the filter so constructed, air to be filtered can flow uniformly in the entire filter cloth through the air passing portion of the frame member formed in the cylindrical shape. Also, in addition to washing by ultrasonic wave, a pulse type air wash can be combined and a sufficient dust removal can be performed.

Further, the filter cloth is constructed of a non-woven fabric including a synthetic resin fiber, whereby the ultrasonic wash can be done repeatedly in the wash liquid. In this case, the ratio of the synthetic resin fiber to the entire fibers is preferable to be 50% or more in volume.

The synthetic resin fiber is preferably a polypropylene or polyester fiber, as it can be produced on a large scale so as to be less expensive, and generates no poisonous gas when it is burned for disposal.

A gas turbine mounted with the above mentioned filter of the present invention can contribute to resource savings and environment preservation. Also, in this gas turbine, the running cost is reduced, as the filter can be washed by the ultrasonic washer so as to be reused.

BRIEF DESCRIPTION OF THE DRAWINGS

FIGS. 3(a) and 3(b) show a gas turbine suction air filter of another embodiment according to the present invention, wherein FIG. 3(a) is a partially cut-out side view and FIG. 3(b) is a transverse cross sectional view.

DESCRIPTION OF THE PREFERRED EMBODIMENTS

Figure 1:
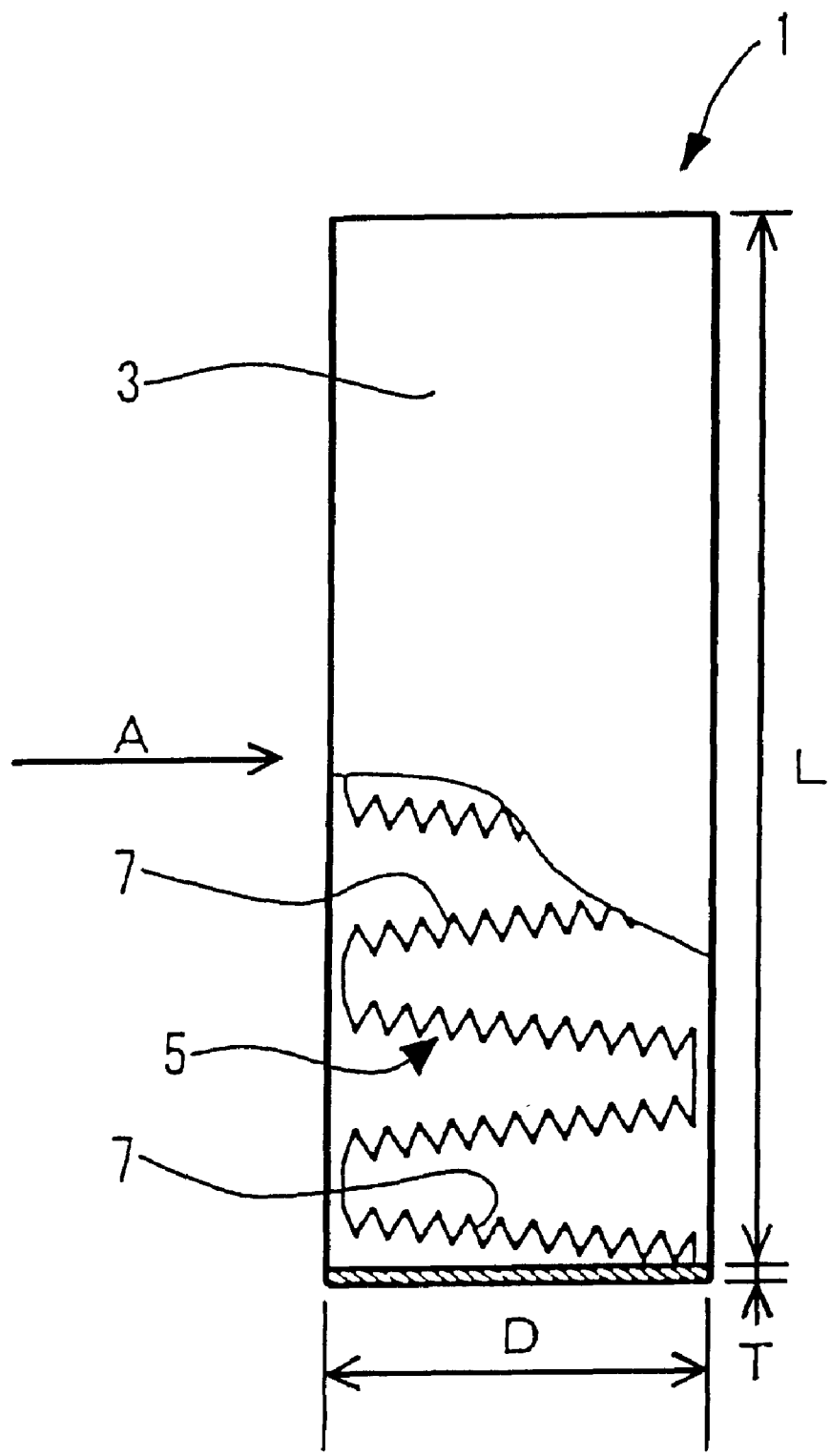
FIG. 1 is a partially cross sectional view of a gas turbine suction air filter of one embodiment according to the present invention.

Herebelow, the present invention will be described concretely based on embodiments and with reference to the appended figures, where appropriate. FIG. 1 is a partially cross sectional view of a gas turbine suction air filter 1 of one embodiment according to the present invention. This filter 1 comprises a box-like frame member 3 and a filter cloth 5 contained in the frame member 3. In FIG. 1, direction A shows an air flow direction.

The frame member 3, when seen from a front view or in the direction A, has a square shape having one side of length L, shown in FIG. 1, of about 0.6 m, for example. Also, the frame member 3 has depth D of about 0.3 m and thickness T of about 1 mm, both for example. Needless to mention, the shape and dimensions of the frame member 3 are not limited to those mentioned above. In the air suction portion of the gas turbine, there are provided a multiplicity of the filters 1 juxtaposed in the upward and downward directions of FIG. 1 and in the perpendicular direction to the plane of FIG. 1, so that a filter portion of the gas turbine is formed.

The frame member 3 is made of a metal material. The metal material effects less damping of ultrasonic wave transmission therein and, being excellent in the strength and rigidity, can make the frame member 3 of a thinner material. By having the frame member 3 made of a the thinner material, the ultrasonic wave transmission in the frame member 3 is less damped. As described later, while the filter cloth 5 is folded, because the frame member 3 is constructed of the metal material, the ultrasonic wave easily reachable the entire filter cloth 5. Thus, dust removal from the filter cloth 5 can be done securely by an ultrasonic washer. Also, in the frame member 3 made of the metal material, no absorption of wash liquid, as seen in a frame member made of a wooden material, occurs.

In the ultrasonic washer, the frame member 3 is dipped in a wash liquid to be washed. Hence, it is preferable that the frame member 3 is constructed of a metal material which is excellent in corrosion resistance. A stainless steel, an aluminum alloy, a titanium alloy, etc. are preferable metal material. Among them, the stainless steel is most preferable as it is produced on a large scale and thus less expensive to obtain.

Figure 2:
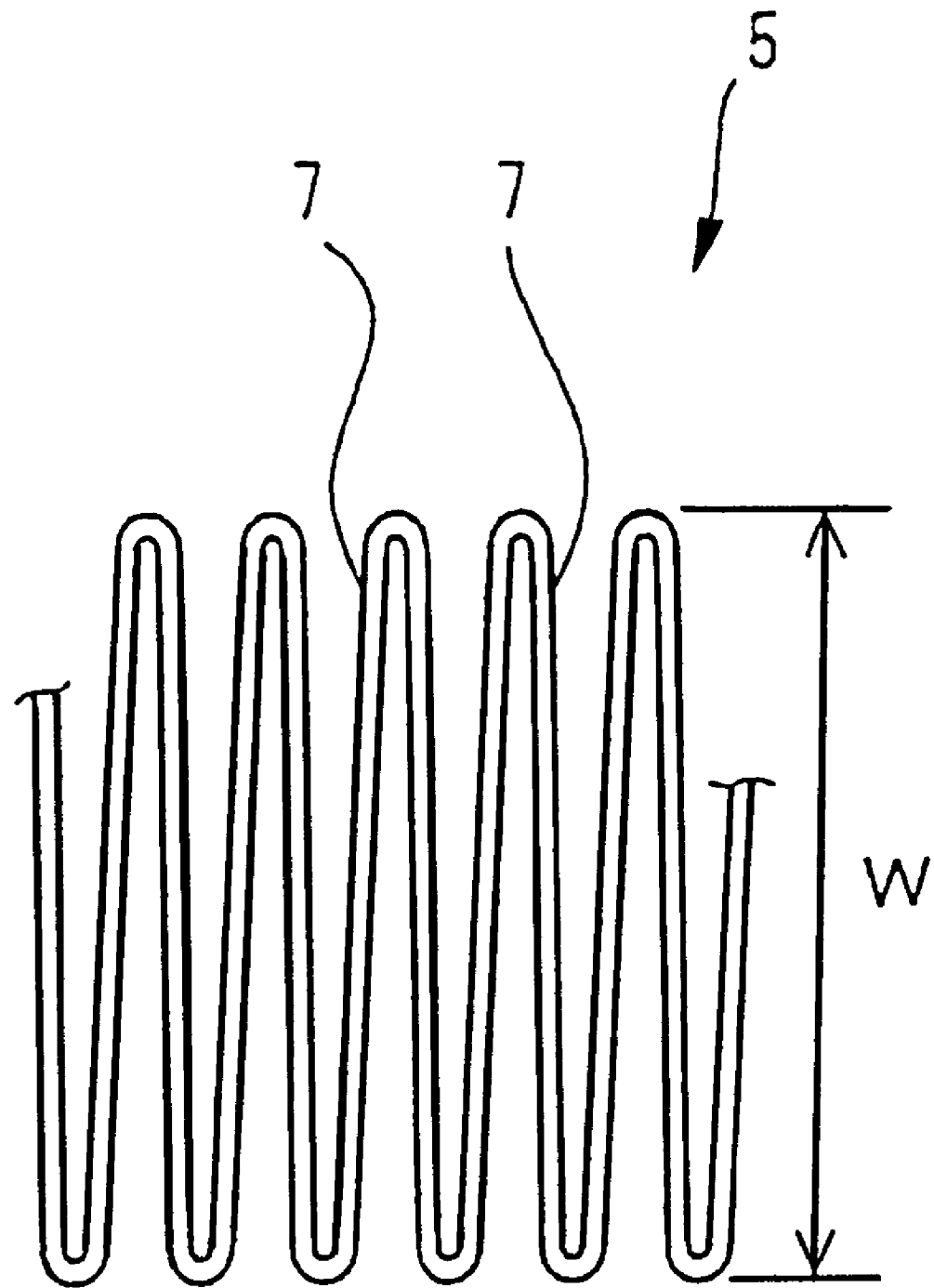
FIG. 2 is an enlarged view of a portion of a filter cloth used in the filter of FIG. 1.

FIG. 2 is an enlarged view of a portion of the filter cloth 5 used in the filter 1 of FIG. 1. As shown in FIG. 1, the filter cloth 5 is formed in pleats or folded portions, wherein a multiplicity of pleat faces or folded faces 7 are formed in series along the air passing direction. Thus, this filter cloth 5 has a large area for passing of air. The filter 1 comprising this filter cloth 5 is of a large capacity and is appropriately used in the gas turbine that consumes a large volume of air. In view of application to a gas turbine, the capacity (volume of air passing through an opening area of 0.35 m$^2$) is preferably 50 m$^3$/minute or more, and most preferably 60 m$^3$/minute or more.

Figure 5:
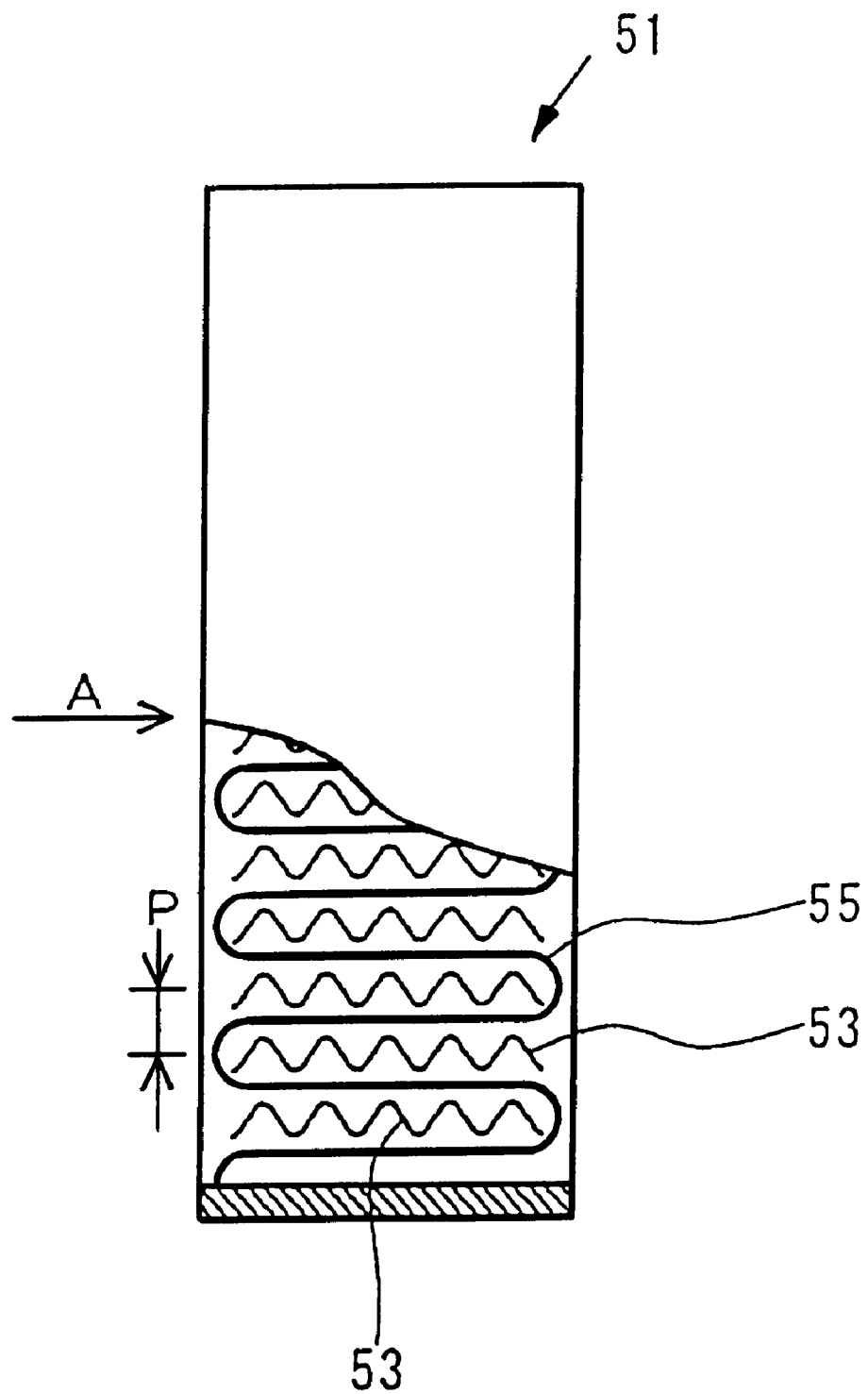
FIG. 5 is a partially cross sectional view of a gas turbine suction air filter in the prior art.

As is clear from a comparison between FIG. 1 and FIG. 5, the width W of the pleat face 7 in FIG. 2 is extremely small as compared with the folded width of the filter cloth 55 of the filter 51 in the prior art. Accordingly, when the filter cloth 5 is washed by the ultrasonic washer, the ultrasonic wave easily reaches the entire filter cloth 5. Also, as adjacent pleat faces directly confront each other with only a space between them, as there is no intervening member such as the separator 53, between adjacent pleat faces 7, 7, no case occurs where an intervening member obstructs the ultrasonic wave transmission. Dust removal by the ultrasonic wave thus becomes easier, That is, while there had been difficulty in washing of the filter 1 in the prior art, reuse of the filter 1 in the gas turbine can be accelerated in the present invention.

The width W of the pleat face 7 is preferably 3 mm or more and 50 mm or less, most preferably 10 mm or more and 30 mm or less. By the width W being selected in this range, the ease of dust removal and high capacity are consistent with each other.

The filter cloth 5 may be either a woven fabric or a non-woven fabric, but the non-woven fabric is usually used. A fiber made of a synthetic resin is preferable fiber used for the filter cloth 5. As the synthetic resin fiber has greater flexibility than a glass fiber, in the non-woven fabric made of the synthetic resin fiber, the fibers are densely entangled with each other so as to hardly loosen. Even if the filter 1 is dipped in the wash liquid of the ultrasonic washer, therefore, the filter cloth 5 is hardly damaged. The synthetic resin fiber is preferably a polypropylene fiber or a polyester fiber for the reason that it is produced on a large scale and thus less expensively and, even if burned for disposal, does not generate a poisonous gas.

Furthermore, in place of the synthetic resin fiber, a porous sheet made of a synthetic resin may be used. The synthetic resin porous sheet has a multiplicity of air passing pores and, as it uses no fiber, will hardly loosens. Thus, even if the filter 1 is dipped in the wash liquid of the ultrasonic washer, the filter cloth 5 is hardly damaged. As there is a need to form the multiplicity of air passing pores in order to secure the filter performance, as well as in view of strength and the manufacturing process, the synthetic resin porous sheet is preferably made of a polytetrafluoroethylene resin as a base material.

The filter cloth 5 may also be constructed by a combination of the synthetic resin fiber and the glass fiber but, in this case, it is preferable that the ratio of the synthetic resin fiber to the entire fibers is 50% or more in volume, most preferably 70% or more in volume.

The adjacent pleat faces 7, may be joined together by thread, whereby positional deviation of the filter cloth 5, caused by water pressure or the like during washing, can be suppressed. Also, there may be provided a rib in the frame member 3 and, by this rib also, positional deviation of the filter cloth 5 due to the water pressure or the like during washing can be suppressed.

Figure 3B:
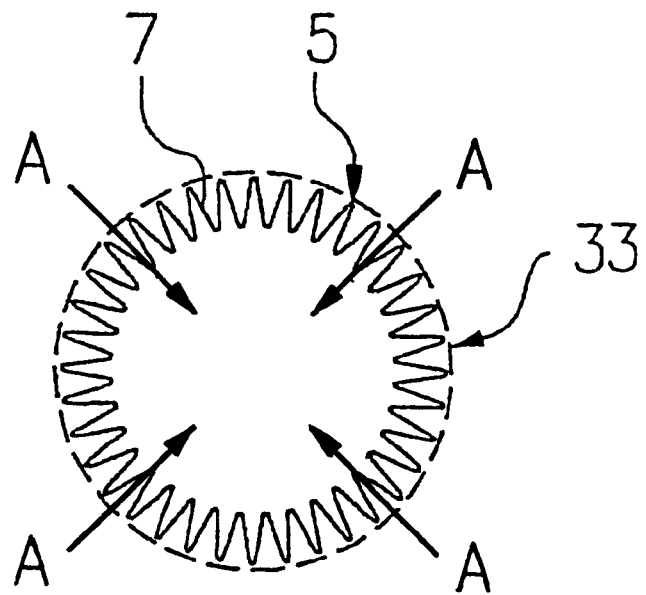
Figure 3A:
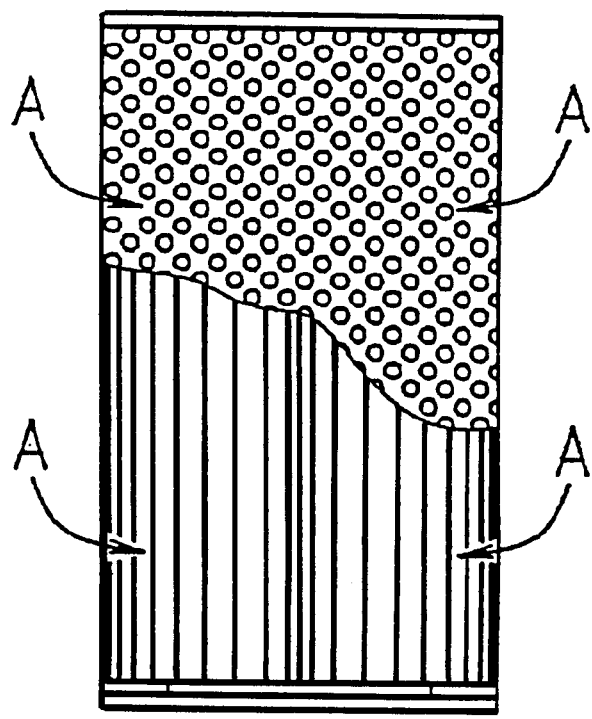

FIGS. 3(a) and (b) show a gas turbine suction air filter of another embodiment according to the present invention. In FIGS. 3(a) and (b), numeral 33 designates a frame member, formed in a cylindrical shape and made of a porous member, such as a punching metal. This porous member forming the frame member 33 has a porosity of 40 to 60%.

In the frame member 33, there is contained a filter cloth 5, formed in a cylindrical shape, made of a synthetic resin non-woven fabric, in which pleat faces or folded faces 7, like in the embodiment shown in FIGS. 1 and 2, are formed in series.

In the filter so constructed, air to be filtered flows in the directions of arrows A shown in FIGS. 3(a) and (b) to pass through the frame member 33 to be filtered.

It is to be noted that, while this filter formed in the cylindrical shape is dipped in a wash liquid to be washed by an ultrasonic washer for reuse thereof, a pulse type air wash (back wash) as a combination with the wash by the ultrasonic washer may be employed for removing dust attaching to the filter by blowing back wash air in a pulse form from downstream of the filter.

Figure 4:
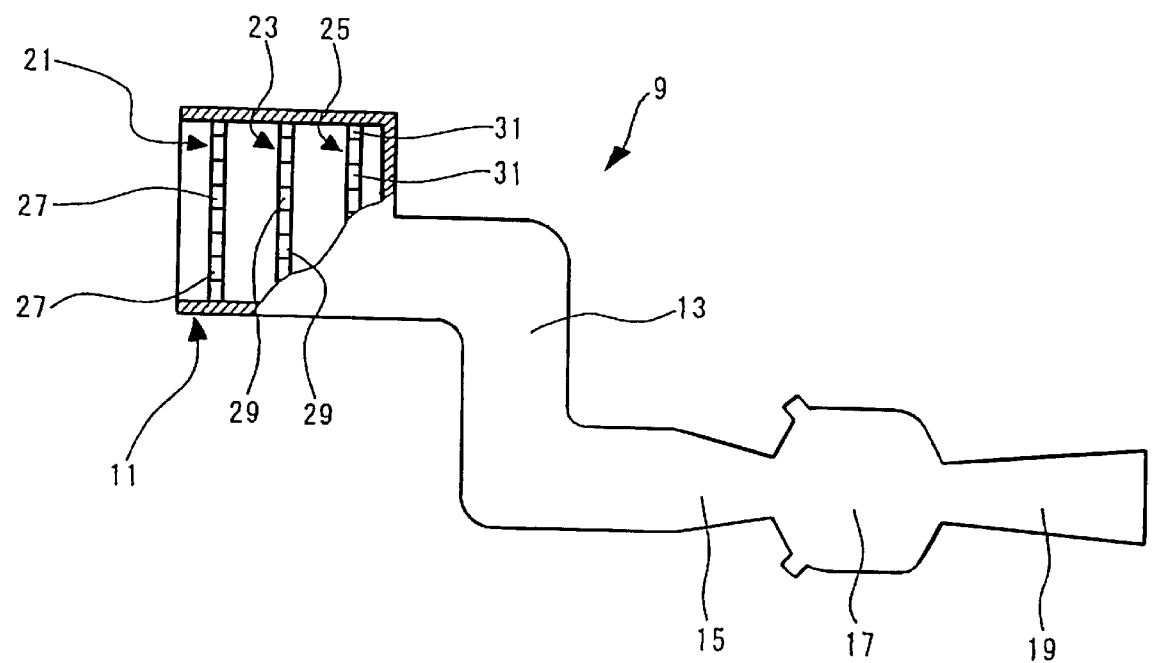
FIG. 4 is a partially cross sectional view of a gas turbine of another embodiment according to the present invention.

FIG. 4 is a partially cut-out cross sectional view of a gas turbine 9 of another embodiment according to the present invention. The gas turbine 9 comprises an air suction portion 11, a duct 13, a compressor 15, a combustor 17 and a turbine portion 19. Air taken from the air suction portion 11 is supplied into the compressor 15 via the duct 13 to be compressed. The compressed air is sent to the combustor 17. In the combustor 17, the compressed air and fuel are mixed together to be burned continuously. By the combustion, a high temperature high pressure combustion gas is generated to be supplied into the turbine portion 19. By expansion of the combustion gas, moving blades of the turbine portion 19 are driven to rotate a rotor and to thereby generate electric power.

The air suction portion 11 comprises a first filter portion 21, a second filter portion 23 and a third filter portion 25. The first filter portion 21 is constructed by a multiplicity of coarse dust filters 27 juxtaposed therein. The second filter portion 23 is constructed by a multiplicity of medium and high performance filters 29 juxtaposed therein. The third filter portion 25 is constructed by a multiplicity of ultra-high performance filters 31 juxtaposed therein. The structure of the medium and high performance filter 29 and the ultra-high performance filter 31, respectively, is approximately same as that of the filter 1 shown in FIG. 1, and there is no intervening member between the pleat faces 7. Thus, while the medium and high performance filter 29 and the ultra-high performance filter 31, respectively, have a large capacity, reuse of the filters by ultrasonic washing is possible. Needless to mention, the coarse dust filter 27 may be constructed similarly to the filter 1 shown in FIG. 1.

According to the filter of the present invention as described above, the filter cloth is constructed to be folded with the multiplicity of the folded faces being formed along the air passing direction and so that adjacent ones of the folded faces directly confront each other with only a space being arranged therebetween and no with intervening member is arranged between the adjacent folded faces. Further, the filter cloth has a large capacity. Hence, it is appropriate for use in a gas turbine that consumes a large volume of air and still enables easy dust removal when it is washed by the ultrasonic washer. Reuse of this filter is facilitated to thereby contribute in resource savings and in environment preservation. In the gas turbine having the air suction portion provided with this filter, the running cost is reduced.

While the preferred form of the present invention has been described, it is to be understood that the invention is not limited to the particular construction and arrangement herein illustrated and described, but embraces such modified forms thereof as come as come within the scope of the appended claims.

What is claimed is:

1. A gas turbine suction air filter capable of being washed with an ultrasonic wave washing unit, comprising:
   a frame member having an air-passing cross section formed in a rectangular shape, said frame member being made of a metal material in order to lessen damping of ultrasonic waves by said frame member, and said frame member having an air passing direction; and
   a filter cloth contained in said frame member, said filter cloth comprising at least 50% synthetic resin fiber by volume;
   wherein said filter cloth is folded such that multiple folded faces are formed along the air passing direction of said frame member;
   wherein adjacent said folded faces directly face each other with only a space there between; and
   wherein said filter has a capacity, for an opening area of 0.35 $m^2$, of at least 50 $m^3$/minute.

2. The gas turbine suction air filter capable of being washed with an ultrasonic wave washing unit of claim 1, wherein said metal material of said frame member has a thickness of about 1 mm.

3. The gas turbine suction air filter capable of being washed with an ultrasonic wave washing unit of claim 1, wherein said metal material of said frame member is stainless steel.

4. The gas turbine suction air filter capable of being washed with an ultrasonic wave washing unit of claim 1, wherein said filter cloth is a nonwoven fabric.

5. The gas turbine suction air filter capable of being washed with an ultrasonic wave washing unit of claim 1, wherein said synthetic resin fiber comprises a polypropylene or a polyester.

6. The gas turbine suction air filter capable of being washed with an ultrasonic wave washing unit of claim 1, wherein said frame member and said filter cloth are structured and arranged so as to be washable with an ultrasonic wave washing unit.

7. A gas turbine having an air suction portion comprising at least one gas turbine suction air filter capable of being washed with an ultrasonic wave washing unit according to claim 1.

8. A method of using a gas turbine suction air filter, comprising:
   drawing air into a gas turbine through a gas turbine suction air filter according to claim 1;
   washing the gas turbine suction air filter with an ultrasonic washer; and
   reusing the gas turbine suction air filter by again drawing air into the gas turbine through the gas turbine suction air filter.

* * * * *